United States Patent Office 3,558,584
Patented Jan. 26, 1971

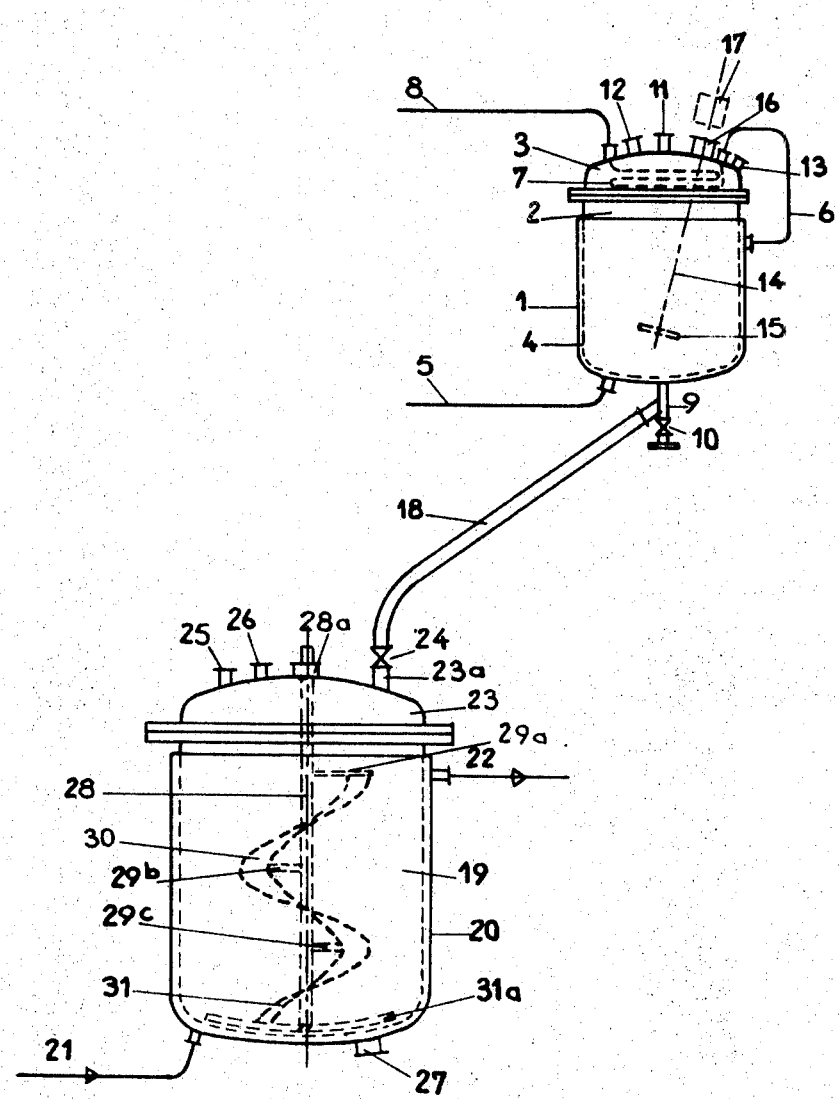

3,558,584
MANUFACTURE OF POLYVINYL CHLORIDE
Jean Claude Thomas, Lyon, France, assignor to Produits
Chimiques Pechiney-Saint-Gobain, Paris, France
Filed Oct. 25, 1966, Ser. No. 589,326
Int. Cl. C08f 1/04, 3/30, 15/30
U.S. Cl. 260—92.8                                  1 Claim

ABSTRACT OF THE DISCLOSURE

Method and apparatus for the polymerization in mass of polyvinyl chloride and mixtures thereof with vinyl acetate, wherein polymerization is carried out in two stages, namely, in a first stage at relatively rapid rate for a relatively short period of time, and in a second stage at a slower rate for a more extended time period. In the second stage polymerization is effected in an autoclave having a vertical axis of symmetry and a helical mixing blade rotating coaxially of the axis of the tank, and having an effective diameter only about one-half the internal diameter of the tank. The blade is rotated at a relatively slow rate but effective to move a column of the mixture continuously rising in and along the axis. This results in a tubular column of the mixture descending by gravity in contact with the temperature-controlled walls of the tank. The result is precise temperature control, improved product, reduced time of production, saving in power, and reduced cost of installations for the production per unit mass of completed product, as compared to prior art procedures and installations.

---

This invention relates to an improved method of, and apparatus for the polymerization of monomeric compositions containing at least a preponderant part of vinyl chloride, in mass, that is, in the absence of solvents, diluents, and dispersing agents.

The present invention is an improvement over those disclosed in applicant's prior copending applications, Ser. No. 347,147 filed Feb. 25, 1964, now abandoned, and Ser. No. 414,697 filed Nov. 30, 1964.

In general, the aforesaid applications disclose methods and apparatuses for the polymerization in mass, of polymers and copolymers of plastic such as vinyl chloride, and consist in dividing the operations of homopolymerization and copolymerization into two stages. The first stage comprises a polymerization in a first apparatus provided with high speed agitation. The first stage is limited to a conversion of monomer of the order of 7 to 15%, and preferably of 8 to 10%. In the second stage the partially converted material is transferred to a second apparatus, where polymerization is continued, the said apparatus being provided with low speed agitation means working near the walls of the apparatus. While the speed of agitation during the second stage is at a speed lower than that employed in the first stage, it is nevertheless sufficient to assure good control of the reaction temperature of the mix, until copolymerization or homopolymerization have been carried out to the desired extent.

The present invention relates to an improved method and apparatus for carrying out the general purposes of the earlier aforesaid applications, wherein the first stage or prepolymerization is performed in a first autoclave having power-driven mixer means capable of being operated at high speeds, such as a mixer of the turbine type. After completion of prepolymerization to a desired degree, the mixture is transferred to an autoclave having a generally vertical axis of symmetry wherein polymerization is completed. This second autoclave has journalled therein for rotation on a central vertical axis, a mixer comprising a helical blade with an outer diameter materially less, for example, one-half, than the inner diameter of the cylindrical tank of the autoclave or container. The mixer is connected with a source of power so that it may be rotated at a relatively slow rate, but, nevertheless, at a speed sufficient to assure good control of the reaction temperature of the mix. Homopolymerization or copolymerization are carried to the desired degree of completion in this second autoclave. The invention thus provides a means by which adequate agitation of the material is effected, as in applicant's prior applications but with a lesser expenditure of power than that required in an autoclave of like capacity but provided with a mixer blade of large or maximum diameter. Furthermore, size for size, the present invention requires only a lighter and less expensive mixer, not only because the smaller diameter of blade or blades takes less power for rotation at any given speed, but also because the lower maximum torque permits a corresponding reduction in size of the shaft, bearings, and related parts, such as radial supporting arms.

In accordance with another important feature of the present invention, the direction of rotation of the shaft and its helical blade fixed thereto, is such that the mass within the autoclave is impelled upwardly in a central vertical stream or column extending about the shaft, while the material returns downwardly, assisted by gravity, in the form of a cylindrical shell or tube contiguous to the walls of the autoclave. Of course these flows are accompanied by adequate agitation of the mix at all times. In this way, complete and efficient circulation is assured, coupled with improved reaction and maximum homogeneity. Further, the walls of the tank are continuously swept clean of accumulations and encrustations, by the downward current, assisted of course by gravity.

The speed of agitation or circulation employed during the second stage of polymerization is, in accordance with the invention, much reduced in comparison with corresponding speeds employed in conventional prior art procedures. The speed employed depends upon the diameter of the mixer and autoclave, on the pitch of the helix of the blade and the width of the blade. These values are selected to assure a circulation of the mixture giving the required reaction. By the present invention it is possible to obtain a first stage of polymerization followed by a second and subsequent stage of polymerization, resins of superior density and compact regular distribution of granules which are of regular and uniform diameters. These superior results are attained in an autoclave having a vertical axis and helical blade stirring or mixing means of diameter materially less diameter than the diameter of the autoclave. Furthermore, the size of the granules can be closely regulated in accordance with the speed or rate of agitation in the prepolymerizer. These great advantages are obtained, moreover, with a significant saving of power over that required by prior art installations and procedures wherein polymerization is effected in a single stage and a single apparatus using a rate or speed of agitation necessarily greater than with the present invention.

This invention enables the completion of polymerization of vinyl chloride and co-monomers of vinyl chloride base, in an autoclave which, in contradistinction to prior disclosures, does not require that the mixer blade or blades pass closely adjacent the walls of the tank of the autoclave, and requires for its operation a motor of relatively low power, because of the small diameter of the blade with respect to the corresponding dimension of the tank. In addition, as previously noted, the present invention operates to continuously maintain the walls of the autoclave free of deposits and encrustations. This effect is attained by the mass of the mixture descending adjacent the walls. The operation is additionally beneficial in that the reaction is improved by the continuous movement of the mixture from the central vertically-upwardly moving column, radially outwardly in all directions toward the walls of the tank, and which acts to maintain a constant and uniform temperature of the mixture throughout.

The invention affords a further advantage because it results in better, quicker, safer, and more efficient filling of the apparatus used during the second stage, reduced cost of construction by reason of the fact that all openings for gages, degassing, etc., are located in the top or cover of the autoclave, and improved separation of the gaseous phase from the constituents to be polymerized during the second stage. Furthermore, the foresaid arrangement facilitates and promotes a saving in materials because with rapid degassing the entrainment of polymer of pulverulent copolymers is negligible.

According to another feature of the invention the prepolymerization is carried out in a vertical autoclave in the presence of a catalyzer having a relatively rapid rate of deterioration, such as one having a half-life of a few hours. As an example, acetylcyclohexanesulfonyl peroxide is identified. The final or second stage of polymerization is likewise performed in a vertical autoclave in the presence of a catalyst having a half-life of 5 to 10 times that of the catalyst used in the first or initial stage. Azodiisobutyronitrile is cited as an example of the second catalyst.

The single figure of the drawing shows one non-limiting embodiment of an apparatus constructed in accordance with the invention and capable of efficiently performing the method. This figure is an elevational view of the first and second autoclaves wherein the first and second stages are successively performed, and showing the interconnections between them.

Referring in detail to the drawing, 1 identifies generally the autoclave in which the first stage, or prepolymerization, is carried out. This apparatus includes a tank 2 having its otherwise open upper end sealed by a cover 3 to make a pressure-tight connection. Tank 2 is surrounded by a jacket 4 through which heat exchange fluid such as water may be circulated by introduction through pipe 5 connected into the base of the compartment formed between tank 2 and jacket 4. The heat exchange fluid exits at the top of the compartment, through pipe 6, passes to heat exchange coils 7 within cover 3, and passes from these coils to exhaust pipe 8. Tank 2 has an outlet pipe 9 through the center of its lower generally spherical end. This outlet pipe is provided with a quick-opening valve 10 for the evacuation of the monomer-polymer mixture resulting from the prepolymerization.

Cover 3 carries on its upper surface a connection 11 through which the prepolymerizer is charged with monomer, a connection 12 for the introduction of gas such as nitrogen, and another connection 13 for the application of vacuum. A shaft 14 having a mixing blade or propeller 15 fixed to its end within tank 2, passes outwardly through a pressure-tight gland or seal 16 and is there connected with a motor 17 by which it may be rotated at high speed. A speed-changer not shown, may be located in shaft 14, exteriorly of the tank, by which the blade may be rotated at a selected speed within an appropriate range.

Unit 1 preferably employs a high speed mixer known by the trade name of "Bicone." The speed selected will be one, based upon experience, which is in general a function of the precise nature of the resin to be produced, that is, its desired granularity and distribution of granular sizes. Also, of course, the speed for any desired granularity will depend upon the type and size of the mixer or agitator. In general the preferred speeds lie between about 500 to 1500 r.p.m., although in some instances speeds less than, or greater than the minimum and maximum values given, may be usefully employed.

As will be understood by those skilled in the art, the prepolymerizer is equipped with the usual indicating instruments of pressure, temperature, relief valve, etc. to enable precise control of the operation and to promote safety.

A conduit 18 has its upper end connected with fitting 9. The conduit may, as shown, be inclined and connected at its lower end with polymerizer 19, having a central vertical axis and surrounded by a jacket 20 through which a heat exchange fluid may be circulated from supply pipe 21 connected adjacent the lower end of the tank and leaving through exhaust pipe 22 near the top. The tank is pressure sealed by a flanged top 23 having a fitting 23a in communication with the lower end of conduit 18 and through which the apparatus is charged from prepolymerizer 1. A valve 24 is provided in fitting 23a for controlling the flow.

Cover 23 of apparatus 19 is also equipped with a connection 25 through which unreacted monomer is withdrawn at the completion of the second or final stage. A relief valve 26 is also provided in cover 23. The mating flanges of the tank 19 and its cover 23 are secured together by bolts or other means, not shown, to effect a pressure-tight joint. At its lower end a fitting 27 is provided through which the polymer is withdrawn at completion of the process.

Apparatus 19 is equipped with a central axial vertical shaft 28 journalled in a thrust bearing 28a in cover 23. This bearing includes gland means not shown, allowing the shaft to rotate freely but preventing the escape from the tank, of fluid under pressure. The shaft is provided with upper, intermediate and lower radially extending and angularly-related rods 29a, 29b and 29c, respectively. A helical mixing blade or ribbon 30 is attached to the ends of these rods for rotation as a unit with the shaft. As shown, the helical blade extends from upper rod 29a to a location near the bottom of the tank, as indicated at 31.

At the start of a cycle of operations the prepolymerizer 1 is charged with monomer and catalyst. Only a small portion of the monomer is lost in degassing. The speed of rotation of the turbine-type mixer blade, and the temperature at which prepolymerization is effected, depend upon the degree of polymerization desired in the first stage. When a predetermined percentage of polymerization has been rapidly attained in the first stage, the valves are opened to effect transfer of the mixture to one of the battery of autoclaves such as 19. This transfer is conveniently effected by gravity. Satisfactory transfer can be effected with slopes of the pipe 18 as low as 10%.

The second or final stage is carried out in apparatus 19 until the desired degree of polymerization, say 70%, has been produced. Then degassing, venting of nitrogen and recovery of the polymer are effected in the usual known way.

The following non-limiting examples show several of the procedures by which the method is advantageously carried out.

EXAMPLE 1

This example is carried out without prepolymerization and is given for purposes of comparison with results attained by the invention as typified in subsequent examples.

880 kg. of vinyl chloride are introduced into a vertical polymerizer of stainless steel of 2 m.$^3$ capacity. The machine is provided with a helical ribbon-like mixer blade having an outer diameter equal to about one-half the internal diameter of the autoclave. Purging is produced by degassing of about 80 kg. of the vinyl chloride. 128 g. of catalyst such as azodiisobutyronitrile are then introduced. This is 0.016% by weight of the monomer. The speed of agitation is maintained at 75 r.p.m. and is in such a direction that a central rising column of the mix is produced along the axis of rotation of the mixer blade and returned downwardly in a tubular stream or column along the walls of the tank. The temperature in the polymerizer is rapidly elevated to 62° C., at a pressure of 9.5 kg./cm.$^2$.

The total time of polymerization is 14½ hrs. After degassing there is obtained 65% of pulverulent polymer of index 62K, Fikentscher. The apparent density of the resin is about 0.35. The percentage of the resin thus obtained, in size distribution, is given in the table following.

TABLE 1

| Screen size (mu): | Percent fallthrough |
| --- | --- |
| 630 | 96 |
| 500 | 94 |
| 400 | 93 |
| 315 | 90 |
| 250 | 80 |
| 200 | 42 |
| 160 | 18 |
| 100 | 5 |

From this table it is noted that there are produced a relatively large percentage of granules of small size. For example, 18% of the granules pass a 160 mu screen and 42% pass a 200 mu screen.

EXAMPLE 2

This example is also given for the purpose of comparison with those following. 880 kg. of vinyl chloride and 144 g. of azodiisobutyronitrile, that is 0.018% based on the weight of the monomer, are introduced into a stainless steel polymerizer of 1000 liters capacity and provided with a "typhoon" type turbine agitator of 300 mm. diameter, rotating at 720 r.p.m. Charging is followed by purging of 80 kg. of monomer. Reaction temperature is raised rapidly to 62° C., and pressure of 9.5 kg./cm.² After two hours of prepolymerization the monomer-polymer mixture is transferred by gravity to a vertical stainless steel polymerizer of 2 m.³ capacity, equipped with a mixer comprising a helical ribbon of stainless steel and which has a diameter only a little less than that of the tank so that the mixer blade operates closely adjacent the tank wall. The rotation of the blade is such that a tubular upward flow is produced adjacent the walls of the tank, accompanied of course, by a downward return flow in a central vertical column. The temperature is raised rapidly to 62° C. at pressure of 9.5 kg./cm.² The total time of polymerization is 16 hours.

After degassing, 72% of pulverulent polymer is recovered, having an index of 62K, Fikentscher, and an apparent density of 0.55. The distribution of sizes of granules resulting from this example are as follows.

TABLE 2

| Screen size (mu): | Percent fallthrough |
| --- | --- |
| 630 | 99 |
| 500 | 98 |
| 400 | 97 |
| 315 | 96 |
| 250 | 95 |
| 200 | 92 |
| 160 | 85 |
| 100 | 1 |

It is noted that the resulting polymer has improved uniformity of granules in larger sizes, over the polymer produced in Example 1, supra.

EXAMPLE 3

This example is illustrative of the present invention. 880 kg. of vinyl chloride, and 144 g. of azodiisobutyronitrile as catalyst, are introduced into a prepolymerizer like the one used in Example 2. The catalyst is 0.018% by weight of the monomer. 80 kg. of monomer are used to purge as in Example 2 and the mixer is operated at 720 r.p.m. Temperature is rapidly raised to 62° C. at a pressure of 9.5 kg./cm.² After 2 hours of prepolymerization the charge is transferred by gravity to a vertical polymerizer of 2 m.³ capacity like the one used in Example 1 previously purged with 80 kg. of monomer. The transfer operation requires only about 1 minute.

In the autoclave or polymerizer the mixer turns at 40 r.p.m. The temperature is maintained constant at 62° C. and pressure at 9.5 kg./cm.², for a period of 14 hours, thus consuming for the two stages a total time of 16 hours. About 72% of pulverulent polymer is obtained, having an index of 62K, Fikentscher, and an apparent density of about 0.56. The distribution of granular sizes of the resulting polymer is as follows:

TABLE 3

| Screen size (mu): | Percent fallthrough |
| --- | --- |
| 630 | 99 |
| 500 | 99 |
| 400 | 98 |
| 315 | 98 |
| 250 | 96 |
| 200 | 92 |
| 160 | 87 |
| 100 | 1 |

It is noted that the size distribution of the polymer obtained is even more uniform and concentrated in larger sizes than in Example 2.

EXAMPLE 4

This example is also in accordance with the present invention. 832 kg. of vinyl chloride, 48 kg. of vinyl acetate, and 184 g. of azodiisobutyronitrile, that is, 0.023% by weight of the monomers, are deposited into a prepolymerizer like the one previously described. Degassing as previously is accomplished with 80 kg. of vinyl chloride of the charge. The speed of mixing in the prepolymerizer is at 720 r.p.m., with temperature rapidly raised to 60° C. at 9 kg./cm.² pressure. Prepolymerization is continued for 2½ hours after which the mixture is transferred to the polymerizer. The transfer requires about 1 minute.

In the polymerizer, which is like the one used in Example 1, supra, the mixer is rotated at 40 r.p.m. The temperature is raised and maintained at 60° C. at pressure of 9 kg./cm.² Polymerization continues for 10½ hours so that the total time required for both stages is about 13 hours. After degassing and emptying in the usual way, there is recovered about 70% of pulverulent copolymer having an index of 56K, Fikentscher, and apparent density of 0.66. The distribution of granule sizes is as follows.

TABLE 4

| Screen size (mu): | Percent fallthrough |
| --- | --- |
| 630 | 99 |
| 500 | 98 |
| 400 | 97 |
| 315 | 96 |
| 250 | 91 |
| 200 | 90 |
| 160 | 27 |
| 100 | 0 |

This example is a variation of procedure in accordance with the present invention 880 kg. of vinyl chloride and 44.4 g. of catalyst acetylcyclohexanesulfonyl peroxide (A.C.S.P.), corresponding to 0.0004% of active oxygen, are charged into a prepolymerizer as in the preceding example. The temperature is raised rapidly to 62° C. and maintained at that value, under 9.5 kg./cm.² pressure. The mixer is rotated at 720 r.p.m. and after 1 hour 15 minutes of prepolymerization, the catalyst is practically spent and the mixture is transferred to the polymerizer previously purged from oxygen with 80 kg. of vinyl chloride. 128 g. of azodiisobutyronitrile, that is 0.016% by weight of the monomer, are added as catalyst. The temperature is elevated rapidly and maintained at 62° C., with pressure of 9.5 kg./cm.² The mixer turns at 40 r.p.m. and polymerization is continued for 12½ hours, making a total time of 13 hours, 45 minutes for the two stages.

With this procedure there is obtained 70.7% of pulverulent polymer of index 62K, Fikentscher, and an apparent density of 0.54. Distribution of granule sizes thus obtained is as follows.

TABLE 5

| Screen size (mu): | Percent fallthrough |
|---|---|
| 630 | 99 |
| 500 | 99 |
| 400 | 99 |
| 315 | 99 |
| 250 | 98 |
| 200 | 90 |
| 160 | 88 |
| 100 | 2 |

From this table it is noted that the polymer obtained is concentrated in larger granules and that a total percentage of the monomer transformed is about the same as in the preceding Examples 3 and 4, despite the fact that the total time of reaction is materially less.

EXAMPLE 6

This example is another variation in accordance with the present invention as set forth in Example 5. The apparatuses employed are the same as described in connection with Example 3, supra.

836 kg. of the monomer together with 40 kg. of vinyl acetate and 44.4 g. of catalyst acetylcyclohexanesulfonyl peroxide, the equivalent of 0.0004% of active oxygen, are charged into the prepolymerizer. Purging is accomplished with 76 kg. of vinyl chloride of the charge. The temperature is rapidly raised to 60° C., and pressure of 9 kg./cm.$^2$, and maintained at these values. The mixer rotates at 720 r.p.m. After 1 hour, 15 minutes of prepolymerization, the catalyst is practically spent and the monomer-copolymer mixture is then transferred to the polymerizer previously purged with 80 kg. of vinyl chloride. 144 g. azodiisobutyronitrile, that is, 0.018% by weight, are introduced as catalyst and the temperature is rapidly brought up to and maintained at 60° C. at pressure of 9 kg./cm.$^2$. The mixer turns at 40 r.p.m. and polymerization is continued for 11 hours, for a total time of 12 hours, 15 minutes.

From this procedure there is recovered 73.2% of pulverulent copolymer having an index of 56K, Fikentscher, and an apparent density of 0.67. The distribution of granule sizes is as given.

TABLE 6

| Screen size (mu): | Percent fallthrough |
|---|---|
| 630 | 99 |
| 500 | 98 |
| 400 | 97 |
| 315 | 94 |
| 250 | 92 |
| 200 | 90 |
| 160 | 25 |
| 100 | 0 |

It is noted that 90% of the particles pass a 200 mu screen, and that 65% of the particles thus produced are between 160 and 200 microns.

Having fully disclosed the invention, what I claim and desire to secure by Letters Patent of the United States is:

1. The improved method of preparation in mass of polymers and copolymers of vinyl chloride base, by homopolymerization or copolymerization of monomers, in which the homopolymerization or copolymerization is carried out in two sequential stages, namely, a first stage effected in a prepolymerizer, wherein the reactive mass is agitated at a high rate effecting a limited conversion of about 7% to 15% and preferably from about 8% to 10%, and a second stage effected in another apparatus wherein the homopolymerization or copolymerization is completed, and equipped to agitate the reactive mass at a slower rate but which rate is nevertheless sufficient to assure homogeneity of temperature throughout the mass, the improvement characterized in that the reactive mass, essentially pulverulent during the second stage, is entrained in an ascending movement in and along the central vertical portion of the polymerizer, to a location near the top thereof, thence impelled radially outwardly in all directions, to the internal walls of the polymerizer tank, then in gravitational descent along the walls thereof, the ascending movement of the reactive mass in the central vertical portion of the polymerizer tank being effected by an agitator consisting of a ribbon blade extending helically about the central vertical axis of rotation of the blade and having a diameter materially less than, preferably about one-half, that of the polymerizer tank, the blade being fixed by suitable supports to a central rotary shaft extending along a vertical axis of rotation.

References Cited

FOREIGN PATENTS 1,382,072  8/1965  France _____ 260—92.8

JOSEPH L. SCHOFER, Primary Examiner

J. A. DONAHUE, Jr., Assistant Examiner

U.S. Cl. X.R.

260—87.1, 87.5